United States Patent [19]

Monji et al.

[11] Patent Number: 4,721,518

[45] Date of Patent: * Jan. 26, 1988

[54] MOLD FOR PRESS-MOLDING GLASS ELEMENTS

[75] Inventors: Hideto Monji, Katano; Masaki Aoki, Mino; Hideo Torii, Higashiosaka; Hideyuki Okinaka, Toyonaka, all of Japan

[73] Assignee: Matsushita Electric Industrial Co., Ltd., Osaka, Japan

[*] Notice: The portion of the term of this patent subsequent to Dec. 16, 2003 has been disclaimed.

[21] Appl. No.: 807,230

[22] Filed: Dec. 10, 1985

[30] Foreign Application Priority Data

Dec. 10, 1984 [JP] Japan ................... 59-259328

[51] Int. Cl.$^4$ ............................................. C03B 5/18
[52] U.S. Cl. .................... 65/374.11; 65/122; 65/26; 249/114 R; 249/116; 249/134; 425/77; 425/DIG. 26
[58] Field of Search .................. 65/26, 37, 122, 133, 65/374.11, 268; 249/114 R, 116, 134; 425/77, DIG. 26

[56] References Cited

U.S. PATENT DOCUMENTS

| | | | |
|---|---|---|---|
| 1,466,640 | 8/1923 | Coleman | 249/116 X |
| 1,868,863 | 7/1932 | Watson et al. | 65/26 |
| 2,947,114 | 8/1960 | Hill | 65/374.11 X |
| 3,397,976 | 8/1968 | Hynd | 65/374.11 X |
| 3,436,203 | 4/1969 | Wu | 65/374.11 X |
| 3,736,109 | 5/1973 | Darling et al. | 65/374.11 X |
| 3,932,085 | 1/1976 | Horback | 249/134 X |
| 4,139,677 | 2/1979 | Blair et al. | 65/37 X |

Primary Examiner—Robert L. Lindsay
Attorney, Agent, or Firm—Wenderoth, Lind & Ponack

[57] ABSTRACT

A mold for press-molding glass elements comprising a base member made of a super hard alloy or a cermet; at least one intermediate layer made of a nitride, a carbide, an oxide or a metal, provided on the base member; and a noble metal layer provided on the intermediate layer for forming a mold surface. An active metal contained in the base member is prevented from diffusing to the mold surface by the presence of the intermediate layer.

18 Claims, 4 Drawing Figures

MOLD FOR PRESS-MOLDING GLASS ELEMENTS

BACKGROUND OF THE INVENTION

1. Field of the Invention

This invention relates to a mold for press-molding glass elements such as lenses and prisms.

2. Description of the Prior Art

Optical glass lenses are in the trend of aspherical design which can achieve simplification of lens compositions of optical devices and reduction of weight of lens elements simultaneously. The aspheric lenses are low in processability and unsuited to mass production in the optical polishing method used in the conventional optical lens manufacturing process. Therefore, direct press-molding method is highly expected as its measure.

The direct press-molding method uses a pair of mold elements each having a desired high-quality and high-precision aspheric surface for molding therebetween a preheated (softened) lump of glass. This method does not require further preparatory operations such as polishing, lapping and any other processes. Therefore, in the direct press-molding method, it is required that the press-molded optical glass lens should have an excellent quality and precision.

To satisfy this requirement, the mold is required to be chemically inactive to the glass at high temperatures, resistant to scratch or other injury on the mold surfaces, and resistant to breakage due to thermal impact. To achieve these requirements, such molds have been studied that uses a super hard alloy mainly consisting of tungsten carbide (WC) or a compound material such as a cermet mainly consisting of titanium carbide (TiC), alumina ($Al_2O_3$), titanium nitride (TiN) or chromium carbide ($Cr_3C_2$) for forming a base member, and a noble metal layer for forming a mold surface.

However, the super hard alloy or cermet base member is a sintered body mainly consisting of tungsten carbide (WC), titanium carbide (TiC), alumina ($Al_2O_3$), titanium nitride (TiN), chromium carbide ($Cr_3C_2$) or other ceramics, sintered by using, as a binder, an active metal such as cobalt (Co), nickel (Ni) and molybdenum (Mo). These active metals, during long-time use of the mold, would diffuse through the noble metal layer to the mold surface, and react with the glass to deposit on the mold surface. As a result, the shape precision of the mold surface would be spoiled, to lower the optical performance of the press-molded optical glass elements.

SUMMARY OF THE INVENTION

An object of this invention is to solve the abovediscussed problems, and provide a mold for press-molding glass elements, having high precision and long life, by preventing the active metals from diffusing to the mold surface.

In order to achieve this object, a mold according to the present invention comprises a base member made of a compound material comprising a ceramic and an active metal, a noble metal layer for forming a mold surface, and at least one intermediate layer provided between the base member and the noble metal layer for preventing the active metal contained in the base member from diffusing to the mold surface.

The compound material for forming the base member may be a super hard alloy mainly consisting of tungsten carbide (WC) or a cermet mainly consisting of titanium carbide (TiC), alumina ($Al_2O_3$), titanium nitride (TiN) or chromium carbide ($Cr_3C_2$). The compound material is sintered by using an active metal such as cobalt (Co), nickel (Ni) and molybdenum (Mo) as a binder.

The noble metal layer may comprise platinum as a main ingredient and at least one member selected from the group consisting of iridium (Ir), osmium (Os), palladium (Pd), rhodium (Rh) and ruthenium (Ru), which do not react with glass materials. The content of platinum is preferably 30–99 weight %.

The intermediate layer may be made of a nitride, a carbide or an oxide which is a ceramic having a covalent or ionic bond and would not be softened or deformed at high temperatures. Preferably, the intermediate layer may be made of at least one member selected from the group consisting of titanium nitride (TiN), chromium carbide ($Cr_3C_2$), titanium carbide (TiC), niobium carbide (NbC), tantalum carbide (TaC), silicon carbide (SiC), alumina ($Al_2O_3$) and zirconia ($ZrO_2$). If two or more intermediate layers are provided, titanium (Ti) and chromium (Cr) may also be used in addition to the above group. By the presence of the intermediate layer, the active metal such as cobalt (Co), nickel (Ni) and molybdenum (Mo) contained in the super hard alloy or cermet of the base member is prevented from diffusing to the noble metal layer and further to the mold surface. If two or more intermediate layers are provided, the effect to prevent the diffusion of the active metal is further improved, and at the same time adhesion to the base member and the noble metal layer can be strengthened.

The above and other objects, features and advantages of the invention will be apparent from the following description taken in connection with some examples and the accompanying drawings.

DESCRIPTION OF THE PREFERRED EMBODIMENTS

Figure 1:
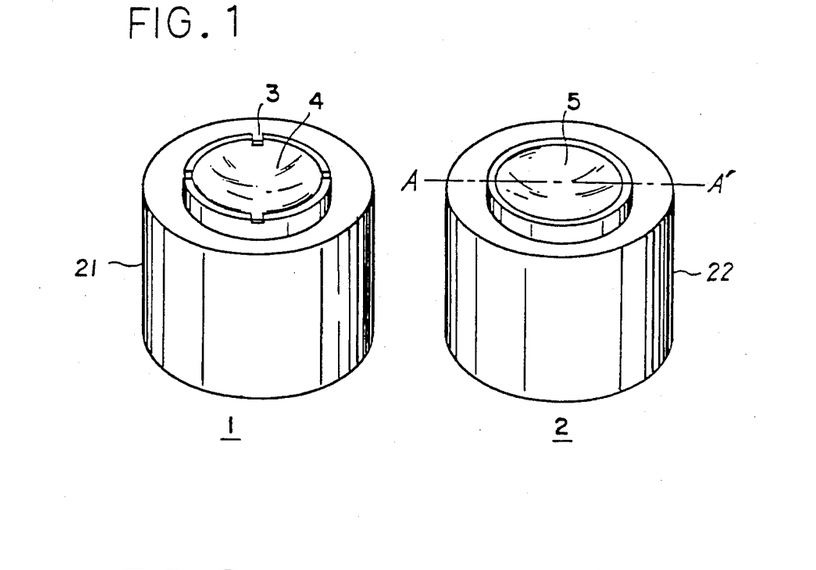
FIG. 1 is a perspective view of a mold according to the present invention.

Referring to FIG. 1, 1 shows an upper mold element having a base member 21 and a mold surface 4, and 2 shows a lower mold element having a base member 22 and a mold surface 5. The upper and lower mold elements 1 and 2 have a same structure as shown in FIG. 2(a) or (b) which shows a partial sectional view taken along a line A—A' in FIG. 1.

Figure 2A:
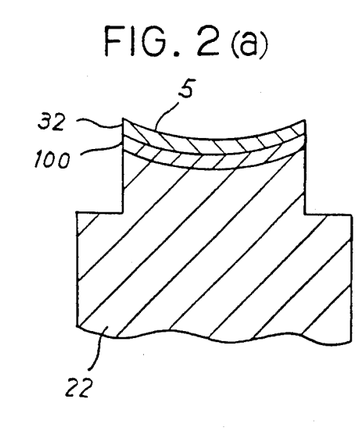
FIGS. 2(a) and (b) are partial sectional views taken along a line A—A' in FIG. 1, showing molds having one intermediate layer and two intermediate layers, respectively.
Figure 2B:
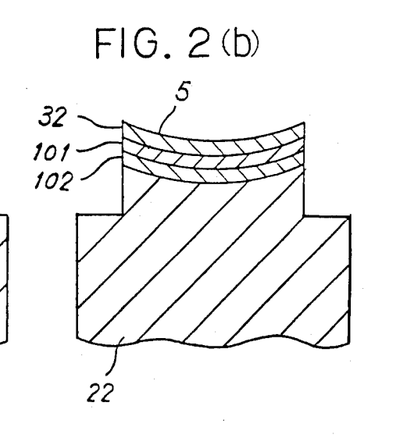

Referring to FIG. 2(a), the mold comprises the base member 22, an intermediate layer 100 provided on the base member 22, and a noble metal layer 32 provided on the intermediate layer 100, the exposed surface of the noble metal layer 32 forming the mold surface 5. Referring to FIG. 2(b), the single intermediate layer 100 in FIG. 2(a) is substituted by two intermediate layers 101 and 102. In FIGS. 2(a) and (b), the intermediate layer is provided only on the upmost surface of the base member, but it may be provided also on the other surfaces of the base member (for the sake of easy manufacturing process, for example). The intermediate layer may be provided so as to substantially isolate the noble metal layer from the base member.

Figure 3:
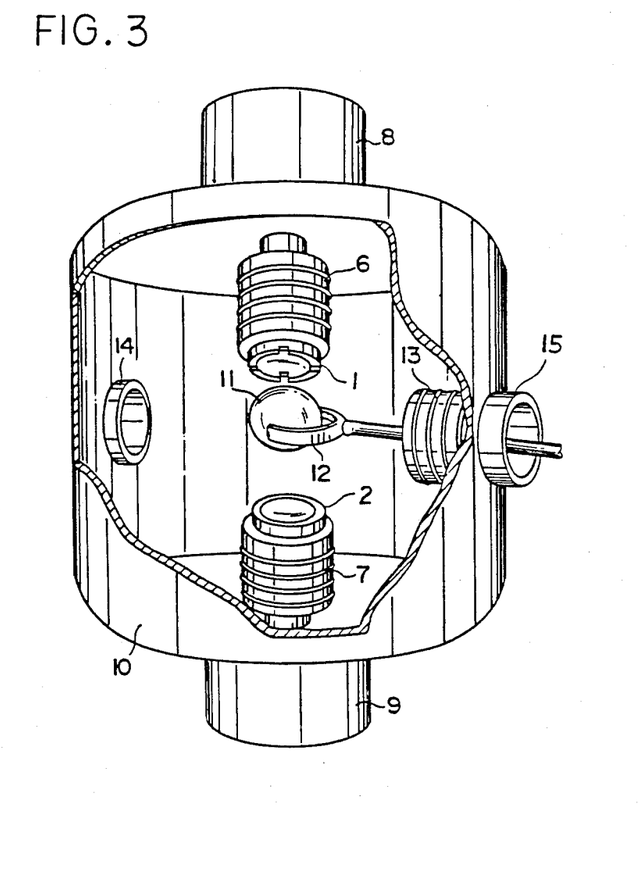
FIG. 3 is a partially cut-away perspective view of a working unit of a molding apparatus using a mold according to the present invention.

FIG. 3 shows a working unit of a molding apparatus using the mold of the invention for press-molding glass elements in it. The upper and lower mold elements 1 and 2 are respectively fixed to upper and lower plungers 8 and 9. Heaters 6 and 7 are respectively wound on the upper and lower mold elements 1 and 2. Since the molding is performed in a nitrogen environment, the working space is provided in a chamber 10. A glass lump 11 held by a material supply arm 12 is supplied from the outside of the chamber 10 through an inlet tunnel 15 and preliminarily head by a pre-heating furnace 13. The pre-heated glass lump 11 is pressed by the heated mold elements 1 and 2 driven by the plungers 8 and 9, and cooled to be a press-molded glass element. The obtained glass element is taken out of the chamber 10 through an outlet tunnel 14.

Hereinafter, some examples of the mold according to the invention will be described.

[EXAMPLE 1]

The base member 21 and 22 of the upper and lower mold elements 1 and 2 were made of columnar materials measuring 30 mm in diameter and 50 mm in length of a super hard alloy (WC-10TiC-10TaC-8Co) comprising tungsten carbide (WC) as a main ingredient, 10 weight % of titanium carbide (TiC), 10 weight % of tantalum carbide (TaC) and 8 weight % of cobalt (Co). A concave surface of 46 mm in curvature radius with four square notches at its periphery was formed on the base member 21, and a concave surface of 200 mm in curvature radius was formed on the base member 22, both by discharge cutting process. Then, these surfaces were lapped to be mirror surfaces by using ultra-fine diamond powder.

On each of these finished surfaces, a 0.01 μm–1 μm thick intermediate layer 10 made of chromium carbide ($Cr_3C_2$), titanium carbide (TiC), niobium carbide (NbC), tantalum carbide (TaC) or silicon carbide (SiC) was formed by physical vapor deposition (PVD) process or chemical vapor deposition (CVD) process. On this intermediate layer 100, a 2 μm thick noble metal layer 32 made of a platinum-rhodium alloy mixed with 15 weight % of rhodium (Pt-15Rh) was formed by sputtering process thereby to form the mold surfaces 4 and 5.

The thus obtained mold elements 1 and 2 were mounted to the molding unit as shown in FIG. 3. A spherical lump 11 of 20 mm in radius of lead oxide glass composed of 70 weight % of lead oxide (PbO), 27 weight % of silicon oxide ($SiO_2$), and the remainder of trace elements was held by the material supply arm 12, and heated in the preheating furnace 13. The heated glass lump 11 was subjected to a pressure of 40 kg/cm² for 2 minutes between the upper and lower mold elements 1 and 2 which had been heated to 500° C. In this state, the upper and lower mold elements 1 and 2 were cooled to 300° C. Then the upper plunger 8 was returned, and the molded glass element was taken out through the outlet tunnel 14.

After the above molding process had been repeated 2,000 times, the upper and lower mold elements 1 and 2 were dismounted. The deposit of cobalt (Co) on the mold surfaces 4 and 5 was measured by an X-ray microanalyzer (XMA), and the surface roughness was detected by a surface roughness meter.

This test was repeated for mold elements having intermediate layers of various compositions and thicknesses. The results are shown in Table 1.

By way of comparison, a conventional structure of mold composed of a base member made of the same material as that of this example and a noble metal layer made of the same material as that of this example directly formed on the base member was prepared, and subjected to the same test as the above. The result is shown in the end of Table 1.

TABLE 1

| Base member | Noble metal layer | Intermediate layer | | Cobalt precipitation (wt. %) | Surface roughness (μm) |
| --- | --- | --- | --- | --- | --- |
| | | Material | Thickness (μm) | | |
| Super hard alloy WC—10TiC—10TaC—8Co) | Platinum-rhodium alloy (Pt—15Rh) | Chromium carbide ($Cr_3C_2$) | 0.04<br>0.7 | 0.3<br>0.1 | 0.04<br>0.03 |
| | | Titanium carbide (TiC) | 0.01<br>0.3 | 0.2<br>0.08 | 0.03<br>0.02 |
| | | Niobium carbide (NbC) | 0.05<br>0.8 | 0.4<br>0.1 | 0.05<br>0.02 |
| | | Tantalum carbide (TaC) | 0.1<br>1.0 | 0.5<br>0.2 | 0.05<br>0.03 |
| | | Silicon carbide (SiC) | 0.02<br>0.5 | 0.9<br>0.1 | 0.06<br>0.02 |
| | | None | | 6.0 | 0.11 |

As clear from Table 1, by providing an intermediate layer made of chromium carbide ($Cr_3C_2$), titanium carbide (TiC), niobium carbide (NbC), tantalum carbide (TaC) or silicon carbide (SiC) between the base member and the noble metal layer, precipitation of cobalt (Co) contained in the base member material onto the mold surfaces 4 and 5 is prevented, and surface smoothness of the mold surfaces 4 and 5 is prevented from being lowered. Actually, the molded glass elements (lenses, in this case) showed extremely excellent optical performances.

On the contrary, in the case of the mold without the intermediate layer, much amount of cobalt (Co) precipitated onto the mold surfaces 4 and 5, and discoloration and lowering of surface smoothness of the mold surfaces 4 and 5 were observed. The optical performances of the molded glass elements were considerably inferior to those of the initially obtained products.

[EXAMPLE 2]

By using a cermet (TiC-5NbC-9Ni) comprising titanium carbide (TiC) as a main ingredient, 5 weight % of niobium carbide (NbC) and 9 weight % of nickel (Ni) as the base member material; chromium carbide ($Cr_3C_2$), titanium carbide (TiC), niobium carbide (NbC), tantalum carbide (TaC) or silicon carbide (SiC) as the intermediate layer material; and a platinum-iridium-palladium alloy (Pt-50Ir-10Pd) comprising platinum (Pt) as a main ingredient, 50 weight % of iridium (Ir) and 10 weight % of palladium (Pd) as the noble metal layer material, the upper and lower mold elements 1 and 2 were prepared in the same process as that of Example 1. Furthermore, for comparison, by using the same base member and noble metal layer materials, the upper and lower mold elements 1 and 2 were made without the intermediate layer.

These mold elements 1 and 2 were subjected to the same test as that of Example 1. The results are shown in Table 2.

TABLE 2

| Base member | Noble metal layer | Intermediate layer Material | Thickness (μm) | Nickel precipitation (wt. %) | Surface roughness (μm) |
|---|---|---|---|---|---|
| Cerment (TiC—5NbC—9Ni) | Platinum-iridium-palladium alloy (Pt—50Ir—10Pd) | Chromium carbide ($Cr_3C_2$) | 0.04 0.7 | 0.2 0.09 | 0.05 0.03 |
| | | Titanium carbide (TiC) | 0.01 0.3 | 0.4 0.1 | 0.05 0.02 |
| | | Niobium carbide (NbC) | 0.05 0.8 | 0.3 0.1 | 0.04 0.03 |
| | | Tantalum carbide (TaC) | 0.1 1.0 | 0.9 0.3 | 0.06 0.04 |
| | | Silicon carbide (SiC) | 0.02 0.5 | 1.2 0.5 | 0.06 0.03 |
| | | None | | 8 | 0.34 |

As clear from Table 2, the intermediate layer is effective to prevent nickel (Ni) contained in the base member material from precipitating onto the mold surfaces 4 and 5, and also to prevent the surface smoothness of the mold surfaces 4 and 5 from being lowered. Actually, all the molded glass elements presented extremely excellent optical performances. On the contrary, in the case of the mold elements without the intermediate layer, much amount of nickel (Ni) precipitated onto the mold surfaces 4 and 5, and discoloration and lowering of surface smoothness of the mold surfaces 4 and 5 were recognized. Actually, the obtained glass elements showed considerable inferiority in their optical performances compared with the initially obtained products.

[EXAMPLE 3]

By using a cermet ($Al_2O_3$-25Cr) comprising alumina ($Al_2O_3$) as a main ingredient, and 25 weight % of chromium (Cr) as the base member material; titanium nitride (TiN), chromium carbide ($Cr_3C_2$), alumina ($Al_2O_3$) or zirconia ($ZrO_2$) as the intermediate layer material; and a platinum-rhodium-osmium-rutenium alloy (Pt-10Rh-70s-7Ru) comprising platinum (Pt) as a main ingredient, 10 weight % of rhodium (Rh), 7 weight % of osmium (Os) and 7 weight % of ruthenium (Ru) as the noble metal layer material, the upper and lower mold elements 1 and 2 were prepared in the same process as that of Example 1. Further, for comparison, by using the same base member and noble metal layer materials, the upper and lower mold elements 1 and 2 without the intermediate layer were prepared.

These mold elements were subjected to the same test as that of Example 1. The results are shown in Table 2.

TABLE 3

| Base member | Noble metal layer | Intermediate layer Material | Thickness (μm) | Chromium precipitation (wt. %) | Surface roughness (μm) |
|---|---|---|---|---|---|
| Cerment ($Al_2O_3$—25Cr) | Platinum-rhodium-osmium-ruthenium alloy (Pt—10Rh—70s—7Ru) | Titanium nitride (TiN) | 0.05 1.0 | 0.4 0.06 | 0.03 0.02 |
| | | Chromium carbide ($Cr_3C_2$) | 0.01 0.3 | 0.9 0.03 | 0.07 0.02 |
| | | Alumina ($Al_2O_3$) | 0.04 0.7 | 0.2 0.01 | 0.03 0.01 |
| | | Zirconia ($ZrO_2$) | 0.06 0.2 | 0.09 0.01 | 0.04 0.02 |
| | | None | | 10 | 0.89 |

As clear from Table 3, the intermediate layer is effective to prevent chromium (Cr) contained in the base member from precipitating onto the mold surfaces 4 and 5, and also to prevent the surface smoothness of the mold surfaces 4 and 5 from being lowered. Actually, all the obtained glass elements presented extremely excellent optical performances. On the contrary, the mold elements without the intermediate layer showed much amount of precipitation of chromium (Cr) onto the mold surfaces 4 and 5, and also discoloration and roughness of the mold surfaces 4 were observed. Actually, the obtained glass elements showed considerable degradation in their optical performances compared with the initially obtained products.

[EXAMPLE 4]

By using a cermet (TiN-30TiC-7Mo) comprising titanium nitride (TiN) as a main ingredient 30 weight % of titanium carbide (TiC) and 7 weight % of molybdenum (Mo) as the base member material; titanium nitride (TiN), titanium carbide (TiC), tantalum carbide (TaC), silicon carbide (SiC) or zirconia (ZrO$_2$) as the intermediate layer material; and a platinum-osmium-palladium-iridium-ruthenium alloy (Pt-50s-5Pd-5Ir-5Ru) comprising platinum (Pt) as a main ingredient, 5 weight % of osmium (Os), 5 weight % of palladium (Pd), 5 weight % of iridium (Ir) and 5 weight % of ruthenium (Ru) as the noble metal layer material, the upper and lower mold elements 1 and 2 were prepared in the same process as that of Example 1. Further, for comparison, by using the same base member and noble metal layer materials, the upper and lower mold elements 1 and 2 without the intermediate layer were prepared.

These mold elements were subjected to the same test as that of Example 1. The results are shown in Table 4.

TABLE 4

| Base member | Noble metal layer | Intermediate layer Material | Thickness (μm) | Molybdenum precipitation (wt. %) | Surface roughness (μm) |
| --- | --- | --- | --- | --- | --- |
| Cermet (TiN—30TiC—7Mo) | Platinum-osmium-palladium-iridum-ruthenium alloy (Pt—50s—5Pd—5Ir—5Ru) | Titanium nitride (TiN) | 0.05 0.9 | 0.6 0.05 | 0.04 0.01 |
| | | Titanium carbide (TiC) | 0.01 0.3 | 0.3 0.07 | 0.03 0.01 |
| | | Tantalum carbide (TaC) | 0.1 1.0 | 0.4 0.1 | 0.05 0.03 |
| | | Silicon carbide (SiC) | 0.02 0.5 | 0.8 0.2 | 0.03 0.01 |
| | | Zirconia (ZrO$_2$) | 0.06 0.2 | 0.07 0.02 | 0.02 0.01 |
| | | None | | 9 | 0.67 |

As clear from Table 4, the intermediate layer is effective to prevent molybdenum (Mo) contained in the base member material from precipitating onto the mold surfaces 4 and 5, and also to prevent the surface smoothness of the mold surfaces 4 and 5 from being lowered. Actually, all the obtained glass elements presented extremely excellent optical performances. On the contrary, the mold elements without the intermediate layer showed much amount of precipitation of molybdenum (Mo) onto the mold surfaces 4 and 5, and also showed discoloration and roughness of the mold surfaces 4 and 5. Actually, the obtained glass elements showed a considerable reduction of their optical performances compared with those of the initially obtained products.

[EXAMPLE 5]

By using a cermet (Cr$_3$C$_2$-13Ni) comprising chromium carbide (Cr$_3$C$_2$) as a main ingredient and 13 weight % of nickel (Ni) as the base member material; chromium carbide (Cr$_3$C$_2$), niobium carbide (NbC), tantalum carbide (TaC), silicon carbide (SiC) or alumina (Al$_2$O$_3$) as the intermediate layer material; and a platinum-rhodium-osmium-iridium-ruthenium-palladium alloy (Pt-40Rh-80s-8Ir-6Ru-6Pd) comprising platinum (Pt) as a main ingredient, 40 weight % of rhodium (Rh), 8 weight % of osmium (Os), 8 weight % of iridium (Ir), 6 weight % of ruthenium (Ru) and 6 weight % of palladium (Pd) as the noble metal layer material, the upper and lower mold elements 1 and 2 were prepared in the same process as that of Example 1. Further, for comparison, by using the same base member and noble metal layer materials, the upper and lower mold elements 1 and 2 without the intermediate layer were prepared.

These mold elements were subjected to the same test as that of Example 1. The results are shown in Table 5.

TABLE 5

| Base member | Noble metal layer | Intermediate layer Material | Thickness (μm) | Nickel precipitation (wt. %) | Surface roughness (μm) |
| --- | --- | --- | --- | --- | --- |
| Cermet (Cr$_3$C$_2$—13Ni) | Platinum-rhodium-osmium-iridium-ruthenium-palladium alloy (Pt—40Rh—80s—8Ir—6Ru—6Pd) | Chromium carbide (Cr$_3$C$_2$) | 0.01 0.3 | 0.4 0.1 | 0.05 0.03 |
| | | Niobium carbide (NbC) | 0.05 0.8 | 0.6 0.2 | 0.06 0.04 |
| | | Tantalum carbide (TaC) | 0.1 1.0 | 0.5 0.1 | 0.06 0.03 |
| | | Silicon carbide (SiC) | 0.02 0.5 | 0.8 0.2 | 0.07 0.02 |
| | | Alumina (Al$_2$O$_3$) | 0.04 0.7 | 0.2 0.007 | 0.05 0.01 |
| | | None | | 11 | 0.23 |

As clear from Table 5, the intermediate layer is effective to prevent nickel (Ni) contained in the base member from precipitating onto the mold surfaces 4 and 5, and also to prevent the smoothness of the mold surfaces 4 and 5 from being lowered. Actually, all the obtained glass elements presented extremely excellent optical performances. On the contrary, the mold elements without the intermediate layer presented much amount of precipitation of nickel (Ni) onto the mold surfaces 4 and 5, and also presented discoloration and lowered smoothness of the mold surfaces 4 and 5. Actually, the obtained glass elements showed considerable reduction of their optical performances compared with those of the initially obtained products.

[EXAMPLE 6]

The upper and lower mold elements 1 and 2 having two intermediate layers as shown in FIG. 2(b) were prepared in a process similar to that of Example 1.

The base member was made of a super hard alloy (WC-10Tic-10TaC-8Co) comprising tungsten carbide (WC) as a main ingredient, 10 weight % of titanium carbide (TiC), 10 weight % of tantalum carbide (TaC) and 8 weight % of cobalt (Co). Each of the two intermediate layers was made of one member selected from the group consisting of titanium nitride (TiN), titanium carbide (TiC), tantalum carbide (TaC), niobium carbide (NbC), silicon carbide (SiC), zirconia (ZrO₂), alumina (Al₂O₃), titanium (Ti) and chromium (Cr). The noble metal layer was made of a platinum-rhodium alloy (Pt-15Rh) comprising platinum (Pt) as a main ingredient and 15 weight % of rhodium (Rh).

For comparison, the mold elements 1 and 2 having a single intermediate layer were prepared. Further, by using the same base member and noble metal layer materials, the mold elements 1 and 2 without the intermediate layer were prepared.

These mold elements were subjected to the same test as that of Example 1. The results are shown in Tables 6-1 to 6-6.

TABLE 6-1

| Base member | Intermediate layer 1st layer | Intermediate layer 2nd layer | Noble metal layer | Cobalt precipitation (wt. %) | Surface roughness (μm) |
|---|---|---|---|---|---|
| Super hard alloy (WC—10TiC—10TaC—8Co) | Titanium nitride (TiN) | Titanium carbide (TiC) | Platinum-rhodium alloy (Pt—15Rh) | 0.1 | 0.01 |
| | | Niobium carbide (NbC) | | 0.2 | 0.02 |
| | | Tantalum carbide (TaC) | | 0.15 | 0.02 |
| | | Silicon carbide (SiC) | | 0.1 | 0.02 |
| | | Chromium (Cr) | | 0.2 | 0.03 |
| | | — | | 0.3 | 0.04 |
| | Titanium carbide (TiC) | Titanium nitride (TiN) | | 0.25 | 0.03 |
| | Niobium carbide (NbC) | | | 0.18 | 0.02 |
| | Tantalum carbide (TaC) | | | 0.14 | 0.02 |
| | Silicon carbide (SiC) | | | 0.09 | 0.01 |
| | Chromium (Cr) | | | 0.2 | 0.02 |
| | Titanium (Ti) | | | 0.2 | 0.02 |

TABLE 6-2

| Base member | Intermediate layer 1st layer | Intermediate layer 2nd layer | Noble metal layer | Cobalt precipitation (wt. %) | Surface roughness (μm) |
|---|---|---|---|---|---|
| Super hard alloy (WC—10TiC—10TaC—8Co) | Titanium carbide (TiC) | Tantalum carbide (TaC) | Platinum-rhodium alloy (Pt—15Rh) | 0.04 | 0.01 |
| | | Niobium carbide (NbC) | | 0.09 | 0.02 |
| | | Silicon carbide (SiC) | | 0.07 | 0.01 |
| | | Zirconia (ZrO₂) | | 0.11 | 0.02 |
| | | Titanium (Ti) | | 0.03 | 0.01 |
| | | — | | 0.20 | 0.03 |
| | Tantalum carbide (TaC) | Titanium carbide (TiC) | | 0.15 | 0.03 |
| | Niobium carbide (NbC) | | | 0.08 | 0.03 |
| | Silicon carbide (SiC) | | | 0.07 | 0.02 |
| | Zirconia (ZrO₂) | | | 0.18 | 0.03 |

TABLE 6-2-continued

| Base member | Intermediate layer 1st layer | Intermediate layer 2nd layer | Noble metal layer | Cobalt precipitation (wt. %) | Surface roughness (μm) |
|---|---|---|---|---|---|
| | | Titanium (Ti) | | 0.06 | 0.02 |
| | | Chromium (Cr) | | 0.09 | 0.02 |

TABLE 6-3

| Base member | Intermediate layer 1st layer | Intermediate layer 2nd layer | Noble metal layer | Cobalt precipitation (wt. %) | Surface roughness (μm) |
|---|---|---|---|---|---|
| Super hard alloy (WC—10TiC—10TaC—8Co) | Tantalum carbide (TaC) | Niobium carbide (NbC) | Platinum-rhodium alloy (Pt—15Rh) | 0.08 | 0.01 |
| | | Silicon carbide (SiC) | | 0.10 | 0.02 |
| | | Zirconia (ZrO$_2$) | | 0.07 | 0.01 |
| | | Alumina (Al$_2$O$_3$) | | 0.09 | 0.01 |
| | | Titanium (Ti) | | 0.15 | 0.02 |
| | | Chromium (Cr) | | 0.13 | 0.02 |
| | | — | | 0.20 | 0.03 |
| | Niobium carbide (NbC) | Tantalum carbide (TaC) | | 0.09 | 0.02 |
| | Silicon carbide (SiC) | | | 0.18 | 0.02 |
| | Zirconia (ZrO$_2$) | | | 0.14 | 0.02 |
| | Alumina (Al$_2$O$_3$) | | | 0.15 | 0.02 |
| | Titanium (Ti) | | | 0.09 | 0.02 |
| | Chromium (Cr) | | | 0.08 | 0.02 |

TABLE 6-4

| Base member | Intermediate layer 1st layer | Intermediate layer 2nd layer | Noble metal layer | Cobalt precipitation (wt. %) | Surface roughness (μm) |
|---|---|---|---|---|---|
| Super hard alloy (WC—10TiC—10TaC—8Co) | Niobium carbide (NbC) | Silicon carbide (SiC) | Platinum-rhodium alloy (Pt—15Rh) | 0.08 | 0.02 |
| | | Zirconia (ZrO$_2$) | | 0.07 | 0.02 |
| | | Alumina (Al$_2$O$_3$) | | 0.05 | 0.01 |
| | | Titanium (Ti) | | 0.09 | 0.02 |
| | | Chromium (Cr) | | 0.08 | 0.02 |
| | | — | | 0.1 | 0.02 |
| | Silicon carbide (SiC) | Niobium carbide (NbC) | | 0.07 | 0.02 |
| | Zirconia (ZrO$_2$) | | | 0.09 | 0.02 |
| | Alumina (Al$_2$O$_3$) | | | 0.06 | 0.01 |
| | Titanium (Ti) | | | 0.07 | 0.02 |
| | Chromium (Cr) | | | 0.08 | 0.02 |

TABLE 6-5

| Base member | Intermediate layer 1st layer | Intermediate layer 2nd layer | Noble metal layer | Cobalt precipitation (wt. %) | Surface roughness (μm) |
|---|---|---|---|---|---|
| Super hard alloy (WC—10TiC—10TaC—8Co) | Silicon carbide (SiC) | Zirconia (ZrO₂) | Platinum-rhodium alloy (Pt—15Rh) | 0.05 | 0.01 |
| | | Alumina (Al₂O₃) | | 0.06 | 0.02 |
| | | Titanium (Ti) | | 0.08 | 0.02 |
| | | Chromium (Cr) | | 0.07 | 0.02 |
| | | — | | 0.1 | 0.02 |
| | Zirconia (ZrO₂) | Silicon carbide (SiC) | | 0.08 | 0.02 |
| | Alumina (Al₂O₃) | | | 0.08 | 0.02 |
| | Titanium (Ti) | | | 0.07 | 0.02 |
| | Chromium (Cr) | | | 0.08 | 0.02 |
| | Zirconia (ZrO₂) | Alumina (Al₂O₃) | | 0.1 | 0.02 |
| | | Titanium (Ti) | | 0.13 | 0.02 |
| | | Chromium (Cr) | | 0.14 | 0.03 |
| | | — | | 0.15 | 0.03 |

TABLE 6-6

| Base member | Intermediate layer 1st layer | Intermediate layer 2nd layer | Noble metal layer | Cobalt precipitation (wt. %) | Surface roughness (μm) |
|---|---|---|---|---|---|
| Super hard alloy (WC—10TiC—10TaC—8Co) | Alumina (Al₂O₃) | Zirconia (ZrO₂) | Platinum-rhodium alloy (Pt—15Rh) | 0.09 | 0.02 |
| | Titanium (Ti) | | | 0.14 | 0.03 |
| | Chromium (Cr) | | | 0.12 | 0.03 |
| | Alumina (Al₂O₃) | Titanium (Ti) | | 0.13 | 0.03 |
| | | Chromium (Cr) | | 0.16 | 0.03 |
| | | — | | 0.20 | 0.04 |
| | Titanium (Ti) | Alumina (Al₂O₃) | | 0.12 | 0.03 |
| | | Chromium (Cr) | | 0.17 | 0.04 |
| | Titanium (Ti) | Chromium (Cr) | | 0.19 | 0.04 |
| | | — | | 0.26 | 0.04 |
| | Chromium (Cr) | Titanium (Ti) | | 0.22 | 0.04 |
| | None | | | 6 | 0.11 |

As clear from Tables 6-1 to 6-6, the two intermediate layers are remarkably effective to prevent cobalt (Co) contained in the base member from precipitating onto the mold surfaces 4 and 5, and also to prevent the surface smoothness of the mold surfaces 4 and 5 from being lowered. Actually, all the obtained glass elements showed extremely excellent optical performances. Further, it can be seen from the Tables that the mold elements having two intermediate layers are more excellent than those having a single intermediate layer. On the contrary, the mold elements 1 and 2 without the intermediate layer showed much amount of precipitation of cobalt (Co) onto the mold surfaces 4 and 5, and also showed discoloration and roughness of the mold surfaces 4 and 5. Actually, the obtained glass elements showed considerable reduction of their optical performances compared with those of the initially obtained products.

As described in the foregoing description, by providing an intermediate layer between the base member and the noble metal layer, a mold for press-molding glass elements possessing an excellent durability can be obtained.

The durability would be further enhanced by providing two or more intermediate layers. It is needless to say that the shapes of the mold surfaces 4 and 5 are not limited to those specified as above, but may be changed to any desired shape for producing lenses, prisms, filters and any other glass elements.

Thanks to the long life withstanding at least 2,000 times of molding operations, the number of exchanges of mold is remarkably decreased thereby to make it possible to massproduce high quality glass elements, which is extremely effective to improve productively and reduce manufacturing cost.

What is claimed is:

1. A mold for press-molding glass elements comprising:
   a base member made of a compound material comprising a ceramic and an active metal;
   a platinum group metal alloy layer for forming a mold surface; and
   at least one intermediate layer provided between said base member and said platinum group metal alloy layer for preventing said active metal from diffusing to said mold surface.

2. The mold according to claim 1, wherein said compound material is a super hard alloy containing tungsten carbide (WC) as a main ingredient.

3. The mold according to claim 1, wherein said compound material is a cermet containing titanium carbide (TiC), alumina ($Al_2O_3$), titanium nitride (TiN) or chromium carbide ($Cr_3C_2$) as a main ingredient.

4. The mold according to claim 1, wherein said platinum group metal alloy layer is made of a platinum alloy comprising platinum (Pt) as a main ingredient and at least one member selected from the group consisting of iridium (Ir), osmium (Os), palladium (Pd), rhodium (Rh) and ruthenium (Ru).

5. A mold for press-molding glass elements comprising:
   a base member made of a compound material comprising a ceramic and an active metal;
   a platinum group metal alloy layer for forming a mold surface; and
   at least one intermediate layer made of a nitride, a carbide or an oxide, and provided between said base member and said platinum group metal alloy layer for preventing said active metal from diffusing to said mold surface.

6. The mold according to claim 5, wherein said compound material is a super hard alloy containing tungsten carbide (WC) as a main ingredient.

7. The mold according to claim 5, wherein said compound material is a cermet containing titanium carbide (TiC), alumina ($Al_2O_3$), titanium nitride (TiN) or chromium carbide ($Cr_3C_2$) as a main ingredient.

8. The mold according to claim 5, wherein said platinum group metal alloy layer is made of a platinum alloy comprising platinum (Pt) as a main ingredient and at least one member selected from the group consisting of iridium (Ir), osmium (Os), palladium (Pd), rhodium (Rh) and ruthenium (Ru).

9. A mold for press-molding glass elements comprising:
   a base member made of a compound material comprising a ceramic and an active metal;
   a platinum group metal alloy layer for forming a mold surface; and
   at least one intermediate layer made of at least one member selected from the group consisting of titanium nitride (TiN), chromium carbide ($Cr_3C_2$), titanium carbide (TiC), niobium carbide (NbC), tantalum carbide (TaC), silicon carbide (SiC), alumina ($Al_2O_3$), zirconia ($ZrO_2$), titanium (Ti) and chromium (Cr), and provided between said base member and said platinum group metal alloy layer preventing said active metal contained in said base member from diffusing to said mold surface.

10. The mold according to claim 9, wherein said compound material is a super hard alloy containing tungsten carbide (WC) as a main ingredient.

11. The mold according to claim 9, wherein said compound material is a cermet containing titanium carbide (TiC), alumina ($Al_2O_3$), titanium nitride (TiN) or chromium carbide ($Cr_3C_2$) as a main ingredient.

12. The mold according to claim 9, wherein said platinum group metal alloy layer is made of a platinum alloy comprising platinum (Pt) as a main ingredient and at least one member selected from the group consisting of iridium (Ir), osmium (Os), palladium (Pd), rhodium (Rh) and ruthenium (Ru).

13. A mold for press-molding glass elements comprising:
   a base member made of a super hard alloy containing tungsten carbide (WC) as a main ingredient or a cermet containing titanium carbide (TiC), alumina ($Al_2O_3$), titanium nitride (TiN) or chromium carbide ($Cr_3C_2$) as a main ingredient;
   an intermediate layer provided on said base member and made of at least one member selected from the group consisting of titanium nitride (TiN), chromium carbide ($Cr_3O_2$), titanium carbide (TiC), niobium carbide (NbC), tantalum carbide (TaC), silicon carbide (SiC), alumina ($Al_2O_3$) and zirconia ($ZrO_2$); and
   a platinum group metal alloy layer provided on said intermediate layer for forming a mold surface and made of a platinum alloy comprising 30 to 99 weight % of platinum (Pt) and at least one member selected from the group consisting of iridium (Ir), osmium (Os), palladium (Pd), rhodium (Rh) and ruthenium (Ru),
   whereby an active metal contained in said base member is prevented from diffusing to said mold surface.

14. A mold for press-molding glass elements comprising:
   a base member made of a compound material comprising a ceramic and an active metal;
   a platinum group metal alloy layer for forming a mold surface;
   two or more intermediate layers provided between said base member and said platinum group metal alloy layer for preventing said active metal from diffusing to said mold surface, said two or more intermediate layers being respectively made of two different materials each being a nitride, a carbide, an oxide or a metal.

15. The mold according to claim 14, wherein each of said two different materials is a member selected from the group consisting of titanium nitride (TiN), chromium carbide ($Cr_3C_2$), titanium carbide (TiC), niobium carbide (NbO), tantalum carbide (TaC), silicon carbide (SiC), alumina ($Al_2O_3$), zirconia ($ZrO_2$), titanium (Ti) and chromium (Cr).

16. The mold according to claim 15, wherein said compound material is a super hard alloy containing tungsten carbide (WC) as a main ingredient.

17. The mold according to claim 15, wherein said compound material is a cermet containing titanium carbide (TiC), alumina ($Al_2O_3$), titanium nitride (TiN) or chromium carbide ($Cr_3C_2$) as a main ingredient.

18. The mold according to claim 15, wherein said platinum group metal alloy layer is made of a platinum alloy comprising platinum (Pt) as a main ingredient and at least one member selected from the group consisting of iridium (Ir), osmium (Os), palladium (Pd), rhodium (Rh) and ruthenium (Ru).

* * * * *